United States Patent [19]

Smith et al.

[11] Patent Number: 5,062,429

[45] Date of Patent: Nov. 5, 1991

[54] ULTRASOUND IMAGING SYSTEM PROBE WITH ALTERNATE TRANSDUCER POLLING FOR COMMON-MODE NOISE REJECTION

[75] Inventors: Lowell S. Smith, Schenectady; Edward J. Piel, Jr., Scotia, both of N.Y.

[73] Assignee: General Electric Company, Schenectady, N.Y.

[21] Appl. No.: 454,581

[22] Filed: Dec. 15, 1989

[51] Int. Cl.$^5$ .................................................. A61B 8/00
[52] U.S. Cl. .................................. 128/661.01; 73/625
[58] Field of Search .................................... 128/661.01; 73/625-626; 310/334, 358

[56] References Cited

U.S. PATENT DOCUMENTS

| | | | |
|---|---|---|---|
| 2,875,355 | 2/1959 | Petermann | 738/625 X |
| 4,117,446 | 9/1978 | Alais | 128/661.01 X |
| 4,145,931 | 3/1979 | Tancrell | 128/661.01 X |
| 4,677,981 | 7/1987 | Coursant | 128/661.01 |

Primary Examiner—Francis Jaworski
Attorney, Agent, or Firm—Marvin Snyder; James C. Davis, Jr.

[57] ABSTRACT

An ultrasonic imaging system has a probe with an even-numbered plurality of N of transducer elements, with one transducer element being present in each of a like plurality N of signal-processing channels, and with successive ones of the transducers polarized in alternating directions. The transducers require channel excitation drive signals which are either a positive-polarity pulse or a negative-polarity pulse, with signal polarity being dependent upon the polarity of the transducer in the particular channel. The processed outputs of each odd channel is connected directly to an associated input of a coherent summer while the processed output of each even channel is individually amplitude-inverted before connection to an associated summer of input. The summation means output is the sum of all channel transducer outputs, with suppression of any common-mode signal appearing anywhere in the system channels, from the transducer to the summation means inputs.

11 Claims, 2 Drawing Sheets

ULTRASOUND IMAGING SYSTEM PROBE WITH ALTERNATE TRANSDUCER POLLING FOR COMMON-MODE NOISE REJECTION

BACKGROUND OF THE INVENTION

The present invention relates to ultrasonic imaging system probes, and, more particularly, to a novel ultrasound probe having increased rejection of undesired common-mode ("noise") signals.

Ultrasonic array imagers form viewable display images from a coherent summation of many individual channel signals. The instantaneous dynamic range of each of these signals often exceeds 60dB For example, a very high instantaneous dynamic range may be required for processing the reflected ultrasonic signal from a blood cell, compared to the reflected signal from calcified plaque in a blood vessel. Because the coherent sum must be accurately performed, even with high instantaneous dynamic signal range, individual signals must be combined with accurate time/phase delay so that both the maxima and minima (nulls) are faithfully produced If there is any common-mode "noise" (i.e. undesired signal) present, the system dynamic range will be reduced, due to the degradation of the coherent sum maxima and the more serious degradation of minima (where destructive interference should occur) so that the clinical utility of the resulting image is reduced. Typically, such common-mode noise can be found in ultrasonic systems due to electromagnetic pickup of extraneous signals from the environment. In fact, it is often the ultrasonic imaging system which itself creates an environment with a significant amount of radiated energy for common-mode pickup, due to various system portions (such as local oscillators, signal processing circuits, video display circuits and the like) radiating energy in the ultrasonic signal bandwidth. While efficient shielding is desirable, it is often difficult to achieve, so that there is always some amount of common-mode electromagnetic noise pickup. Often this noise is picked up through the ultrasonic transducer probe which, having many relatively high impedance (typically greater than 100 ohm) transducer elements each coupled to a long (6-10 feet) cable of somewhat lower impedance (typically less than 80 ohms), allows each probe to act as an antenna for electromagnetic signals. Since the personnel utilizing the ultrasonic imaging system prefer a probe having relatively low mass and highly flexible cables, good electromagnetic shielding of the probe/cable assembly is difficult to implement.

While it has been proposed to alternate signal phase in the ultrasonic receiver electronics channels, in order to minimize common-mode noise, the typical implementation thereof utilizes an amplifier, with either a differential input or a differential output, so that signals from adjacent channels are connected to opposite sides of the differential devices. One such system is described and claimed in our co-pending U.S. Pat. application Ser. No. 07/445,521, filed Dec. 4, 1989, now U.S. Pat. No. 4,984,465 issued Jan. 15, 1991, assigned to the assignees of the present invention, and incorporated herein in its entirety by reference. Such a system, using a transformer in each channel, fails to suppress common-mode noise pickup ahead of the transformer. It is highly desirable to provide an ultrasonic imaging system probe having undesired common-mode signal rejection in the entirety of each imaging system channel.

BRIEF SUMMARY OF THE INVENTION

In accordance with the invention, an ultrasonic imaging system has a probe with an even-numbered plurality N of transducer elements, with one transducer element being present in each of a like plurality N of signal-processing channels, and with successive ones of the transducers polarized in alternating directions. Preferably, the transducers are fabricated of a piezoelectrically-hard,, high-dielectric material, so that polarization can be performed after the probe is assembled. The transducers require channel excitation drive signals which are either a positive-polarity pulse or a negative-polarity pulse, with signal polarity being dependent upon the polarity of the transducer in the particular channel. Each channel transducer can have a different sensitivity, which must be accounted for in the channel signal processing means. The processed output of each odd channel is connected directly to an associated input of a summation means while the processed output of each even channel is individually amplitude-inverted before connection to an associated input of the summation means. The summation means output is the sum of all channel transducer outputs, with suppression of any common-mode signal appearing anywhere in the system channels, from the transducer to the summation means inputs.

Accordingly, it is an object of the present invention to provide a novel common-mode-noise-reducing probe for an ultrasonic imaging system.

This and other objects of the present invention will become apparent upon reading the following detailed description of a presently preferred embodiment, when considered in conjunction with the drawings.

DETAILED DESCRIPTION OF THE INVENTION

Figure 1:
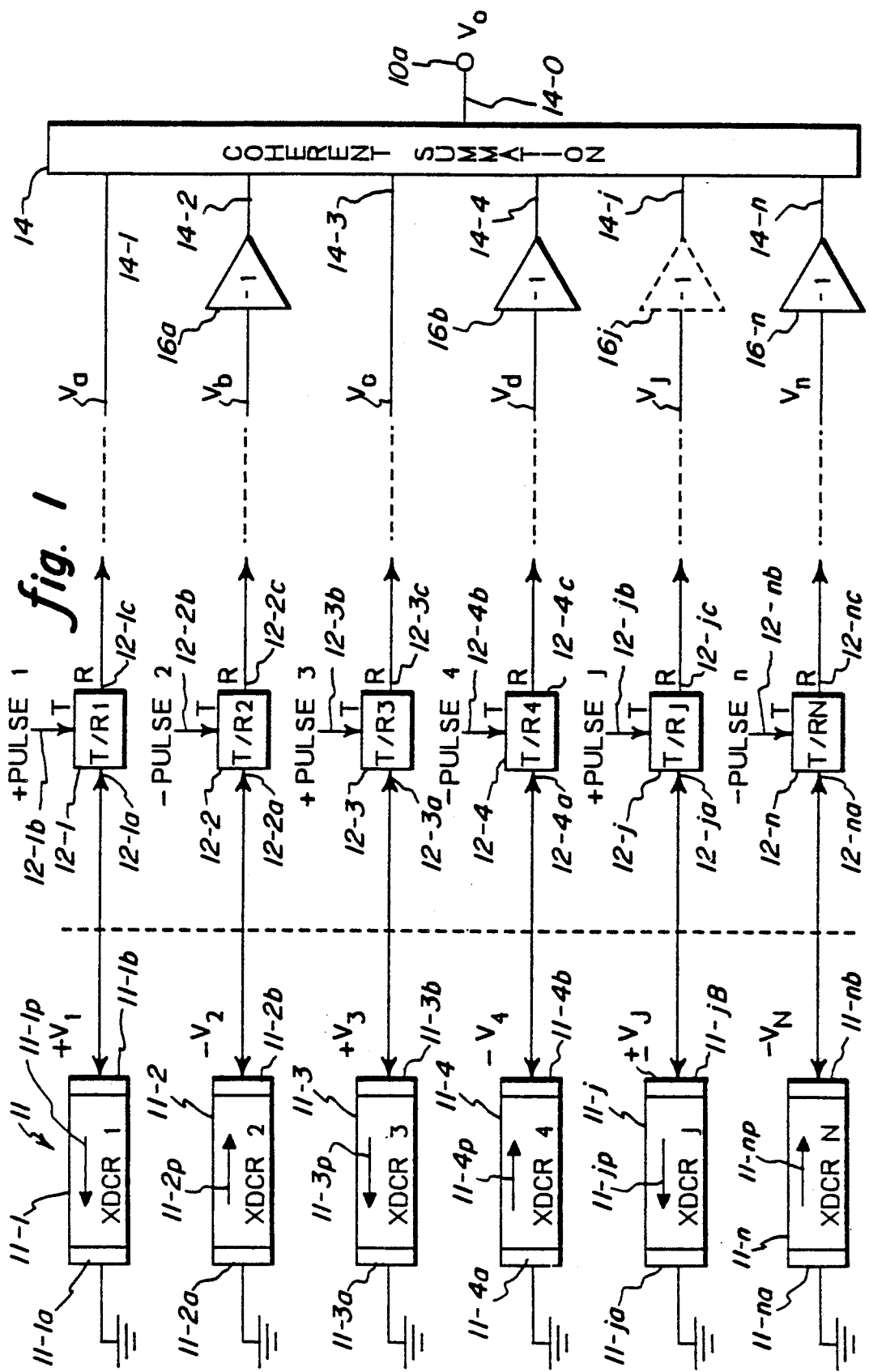
FIG. 1 is a schematic block diagram of a portion of an ultrasonic imaging system, in which the present invention is utilized.

Referring initially to FIG. 1, in an ultrasonic imaging system, a probe 10 includes an array 11 of an even number N of transducers 11-1 through 11-$n$. Each transducer has a first electrode 11-1$a$ through 11-$na$ which is maintained at a common potential, such as system ground potential. Each transducer also has an opposite electrode 11-1$b$ through 11-$nb$, each of which is connected to an associated first port 12-1$a$ through 12-$na$ of an associated transmit/receive (T/R) means 12-1 through 12-$n$. Each T/R means receives, on transmission, an excitation pulse at a transmit T input 12-1$b$ through 12-$nb$. The excitation energy reflected back to each array transducer is returned through the channel T/R means, and appears at a received-signal R output 12-1$c$ through 12-$nc$, thereof This signal is carried, as by shielded cables and the like (not shown) to channel signal processing means (also not shown) providing a channel processed signal $V_a$, $V_b$, $V_c$, $V_d$, ..., $V_j$, ..., $V_n$.

In accordance with the invention, the array transducers 11 are "polled" (polarized) in alternating fashion, such that polarization indicators (denoted by arrows 11-1$p$ through 11-$np$, from a more-positive-potential electrode to a more-negative-potential electrode, and forming the field across the transducer in normal operation) are directed in opposite directions in adjacent transducers. Thus, the odd-numbered transducers 11-1, 11-3, ..., 11-$j$, ... each have a polarization indicator 11-1$p$, 11-3$p$, ..., 11-$jp$, ... in a "positive" direction (e.g. from right-hand electrode 11-$jb$ to left-hand electrode 11-$ja$), while the even-numbered transducers 11-2, 11-4, ..., 11-$n$ all have polarization indicators 11-2$p$, 11-4$p$, ..., 11-$np$ all directed in the opposite direction (from the left-hand electrode 11-$ja$ to the right-hand electrode 11-$jb$). It will be seen that excitation pulses in one channel must be provided with opposite polarity to the excitation pulses to the transducer in the next sequential channel. Thus, as the polarization indicator arrows were defined to flow from the more-positive electrode to the more-negative electrode, all of the odd-numbered transducers must receive a positive-polarity excitation pulse at the non-common electrode 11-$jb$, while all of the even-numbered transducers must receive a negative-polarity excitation pulse of substantially the same amplitude and shape. Therefore, a positive-amplitude pulse must be supplied to the driven electrodes 11-1$b$, 11-3$b$, ..., 11-$jb$, ... of each odd-numbered transducer from the common port 12-1$a$, 12-3$a$, ..., 12-$ja$, ... of each odd-numbered one 12-1, 12-3, ..., 12-$j$, ... of a like plurality (N/2) of the T/R means; similarly, a negative-polarity pulse must be supplied to the driven electrodes 11-2$b$, 11-4$b$, ..., 11-$jb$, ..., 11-$nb$ of each of the even-numbered transducers, from the common port 12-2$a$, 12-4$a$, ..., 12-$ja$, ..., 12-$na$ of each even-numbered ones 12-2, 12-4, ..., 12-$j$, ..., 12-$n$ of a like plurality (N/2) of the T/R means. Therefore, the odd-numbered transmission T inputs 12-1$b$, 12-3$b$, ... each receive a positive-polarity excitation pulse signal and the even-numbered transmission T inputs 12-2$b$, 12-4$b$, ..., 12-$nb$ each receive a negative-polarity excitation pulse signal During reception, the T/R means merely gates the reception signal from the non-common transducer electrode 11-$jb$ through to the received-signal R output 12-$jc$, for that j-th channel, where $1 \leq j \leq n$; a coherent summation of the channel signals, in summation means 14, requires that the received signals for each of the even-numbered channels must be, after signal processing, amplitude-inverted, by inverter ($-1$) means 16 in each of the negative-polarity channels. A coherent sum signal $V_0$ is provided, at a coherent summation means output 14-0, as the sum of the signals at a like plurality N of inputs 14-1 through 14-$n$, with each of the inputs receiving an associated processed channel receive signal; the summation means odd-numbered inputs directly receive the associated processed channel signal, while the processed channel signal in each even-numbered channel must be amplitude-inverted, by one of amplitude inverters 16, prior to coupling to the associated input. Thus, odd-numbered channel 1, being a positive-polarity channel, does not require inversion of the amplitude of its processed receive signal, prior to coupling to summation input 14-1, nor do the signals on odd-numbered channels 3, ... require inversion prior to connection to summation input 14-3, ... However, the processed signal $V_b$ from even-numbered transducer 2 is inverted by first inverter 16$a$, prior to introduction (as a signal $-V_b$) into coherent summation means second input 14-2. Likewise, the processed fourth-channel signal $V_d$ is inverted by second inverter 16$b$, prior to introduction (as a signal $-V_d$) into summation means input 14-4. Similarly, if the j-th channel is an even-numbered channel, an inverter 16$j$ is utilized to invert the channel processed receive signal $V_j$ amplitude prior to introduction into the associated summation means input 14-$j$. Since the last (n-th) channel is an even-numbered channel, its processed receive signal amplitude $V_n$ requires inversion in a last inverter 16$n$, prior to introduction (as a signal $-V_n$) into the last coherent summation means input 14-$n$.

In operation, the instantaneous signal output from each transducer depends upon the location of that transducer in the array, and the polarity of the transducer polling. Thus, first transducer 11-1 provides an output $+V_1$ signal, while second transducer 11-2 provides an output signal $-V_2$, third transducer 11-3 provides a signal $+V_3$, a fourth transducer 11-4 provides an output signal $-V_4$, and so on, with the j-th transducer providing an output signal $\pm V_j$, where the polarity is positive if the transducer is an odd-numbered transducer and is negative if even-numbered. The final transducer 11-$n$, being an even-numbered transducer, provides an output signal $-V_N$. Any common-mode signal, having a common amplitude characteristic in substantially all channels, can be represented as a $+V_{cm}$ signal therein. Thus, the channel signal (whether analog or digitally processed), immediately prior to coherent summation means 14 and any channel inverter 16 (if used), is a signal $V_a$ through $V_n$, where $V_a = +V_1' + V_{cm}'$, $V_b = -V_2' + V_{cm}'$, ..., $V_n = -V_N' + V_{cm}'$, where the j-th channel signal $V_j'$ is the desired processed $V_j$ signal from the transducer in that channel and $V_{cm}'$ is the processed common-mode undesired signal which has been picked-up anywhere along that channel, from the transducer 11-$j$ to the summer or inverter input. After inversion of the even-numbered channel signals in means 16, the coherent sum $V_0$ will be seen to be $$V_0 = V_a - V_b + V_c - V_d + \ldots - V_n,$$

so that $$V_0 = \frac{N}{2} V_{cm}' - \frac{N}{2} V_{cm}' + \sum_{i=1}^{N/2} + V_{2i-1} - (-V_{2i}).$$

The processed common-mode undesired signals $V'_{cm}$ cancel, for all Common-mode signal frequencies sufficiently less than the reciprocal of any differential channel time delays introduced during processing, so that $$V_0 = \sum_{i=1}^{N} V_i.$$

For example, in a typical ultrasonic imaging system wherein reception beam formation is accomplished through the introduction of channel time delays on the order of up to tens of microseconds, common-mode signals having a maximum frequency on the order of 1 kilohertz are greatly reduced (between 18 and 26 db.), and even the signals having a somewhat higher frequency can undergo some suppression.

While not explicitly shown in FIG. 1, it will be understood that both positive-potential and negative-potential pulses for transducer excitation need not be required if the common transducer electrodes are floated at a voltage of one selected polarity, with an amplitude equal to the peak transducer excitation voltage. The excitation pulse has a normal, resting value substantially equal to that polarity and amplitude, with the odd-numbered transducers being pulsed to a voltage of that polarity and to twice that peak value for excitation, and the even-numbered transducers being pulsed substantially to a zero amplitude during excitation.

Figure 2:
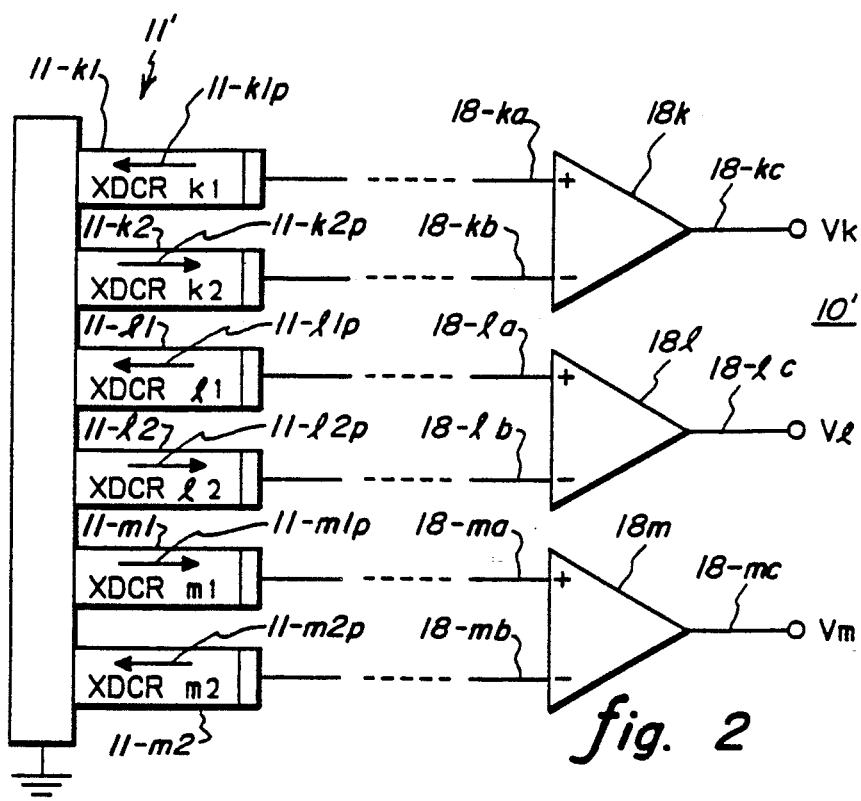
FIG. 2 is a schematic block diagram of a portion of another ultrasonic imaging system, utilizing another embodiment of the present invention.

Referring now to FIG. 2, in certain systems it may be desirable to separate each channel transducer into a pair of adjacent transducers, of opposite polling, with the outputs thereof (after preliminary processing) being provided to the differential inputs of a channel differential amplifier. The amplifier output provides a channel signal in which the common-mode signal received by both channel transducers is at least attenuated, if not cancelled. Thus, in probe 10', the k-th channel has first and second transducers 11-$k$1 and 11-$k$2, having oppositely-polled transducer material, as indicated by "positive" polling arrow 11-$k$1$p$ and by "negative" polled arrow 11-$k$2$p$. Similarly, a next channel 11-$l$ as a pair of transducers 11-$l$1 and 11-$l$2, which may be similarly polled, e.g. with a first transducer 11-$l$1 having a positive polling, as indicated by arrow 1-$l$1$p$, and the second transducer 11-$l$2 having a negative polling as indicated by arrow 11-$l$2$p$. Alternatively, an adjacent channel may have the alternate pollings of its transducer pair reversed from the alternate pollings of the adjacent pair, as shown by the m-th channel transducers 11-$m$1 and 11-$m$2, in which the first channel transducer 11-$m$1 has a negative polling, shown by arrow 11-$m$1$p$, opposite to the positive-polling of arrow 11-$m$2$p$ in second channel transducer 11-$m$2, but opposite to the polling in the pair of transducers of the adjacent channel Whether like or reversed polling is utilized for the channel transducer pair, the output of the first transducer in the channel is provided to the first input of a channel differential amplifier 18, while the output of the other channel transducer is provided to the opposite differential amplifier input; the channel signal being taken from the amplifier output. Thus, in the k-th channel, the first transducer 11-$k$1 output is applied to a first (non-inverting) input 18-$ka$ of the channel amplifier 18-$k$, while the output from the second channel transducer 11-$k$2 is applied to the other (inverting) amplifier input 18-$kb$; the reduced-common mode signal $V_k$ is taken from output 18-$kc$. Similarly, in the $l$-th channel, the first transducer 11-$l$1 output is applied to a first (non-inverting) input 18-$la$ of the channel amplifier 18-$l$, while the output from the second channel transducer 11-$l$2 is applied to the other amplifier input 18-$lb$; the reduced-common-mode signal V is taken from output 18-$lc$. Likewise, in the m-th channel, the first channel transducer 11-m1 output is applied to a first (non-inverting) input 18-$ma$ of the channel amplifier 18-$m$, while the output from the second channel transducer 11-$m$2 is applied to the other amplifier input 18-$mb$; the reduced-common-mode signal $V_m$ is taken from output 18-$mc$.

Figure 3A:
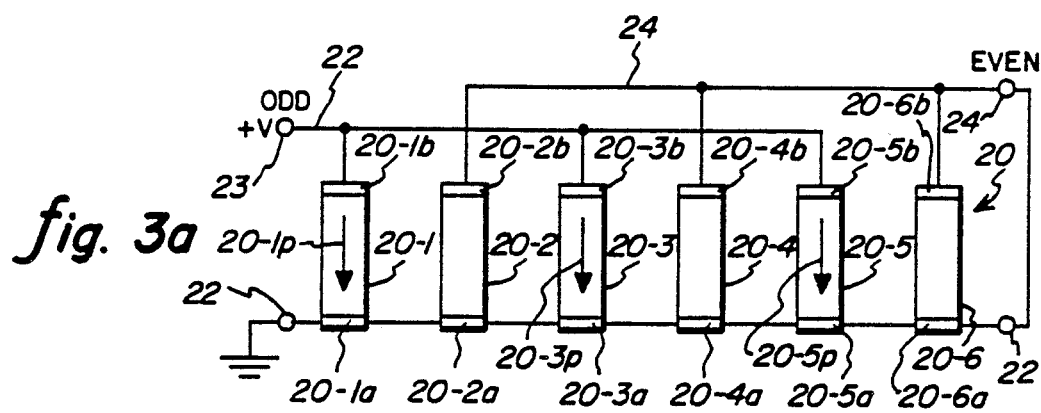
FIGS. 3a and 3b are schematic diagrams illustrating the manner in which the transducer elements can be polarized after the probe has been at least partially assembled.
Figure 3B:
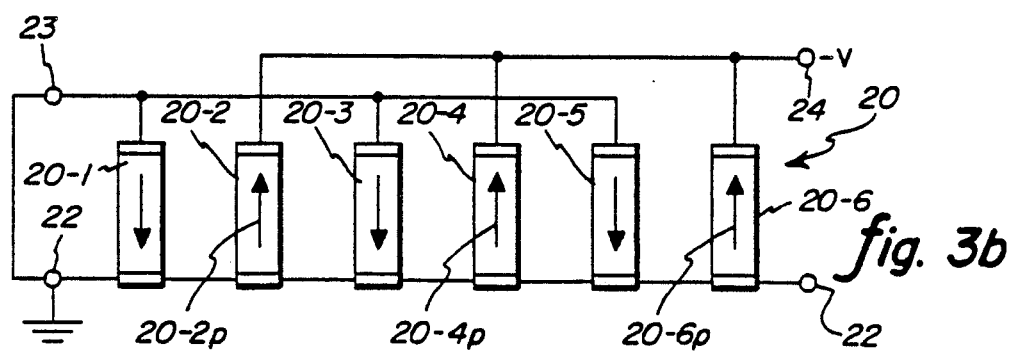

Referring now to FIG. 3$a$ and 3$b$, the piezoelectric transducer elements of an array 20 are polarized by application of a high-voltage DC signal, after the probe is at least partially constructed, e.g. constructed to such an extent that the individual transducer elements are placed in the array and their electrodes are at least temporarily connectable to either a common array bus 22, a first array driving node 23 or a second array driving node 24. Since the direction of polarization determines the sign of the force and velocity produced by a given applied voltage and, conversely, the sign of voltage, for a given applied force, depends on the direction of the polarization, we can set the polarization by the direction of the applied electric field, which is set by the polarity of the voltage applied to either node 23 or node 24. Thus, common potential node 22 is connected to the first electrodes 20-1$a$ through 20-6$a$ of a sample of six transducer elements 20-1 through 20-6, in an illustrated array 20. A positive potential node 23 is (FIG. 3$a$) connected to the remaining electrodes 20-1$b$, 20-3$b$ and 20-5$b$ of the odd-numbered transducers, which will be polled in the positive direction by application of a sufficiently positive-polarity potential $+V$. While the positive-polarity potential is applied to node 23, the remaining node 24, to which is connected the remaining electrodes 20-2$b$, 20-4$b$ and 20-6$b$ of the remaining elements 20-2, 20-4 and 20-6, is itself connected to ground potential. The positive $+V$ potential is maintained across the transducer piezoelectric elements for a time (e.g. several minutes) sufficient to permanently polarize the elements Thereafter, the odd-numbered non-common electrodes are connected (FIG. 3$b$) to ground potential by linking node 23 to common bus 22, and remaining node 24 is subjected to a suitable high voltage, negative-polarity potential $-V$ to polarize the negative-polarity elements. In a particular array of transducers constructed from a lead-zirconate-titanate piezoelectric ceramic, the electric field magnitude V was approximately 34KV/inch, maintained for approximately one minute, for polarization of the piezoelectric elements.

While several presently preferred embodiments of our novel invention have been described in detail herein, many modifications and variations will now become apparent to those skilled in the art. For example, while the invention is shown as used in an analog system, it will be understood that use is also possible in digital form; summation of digital signals, after analog-to-digital conversion and digital processing, will provide the desired common-mode signal cancellation. It is our intent, therefore, to be limited only by the scope of the appending claims and not by the specific details and instrumentalities presented by way of explanation herein.

What we claim is:

1. An ultrasonic imaging system having common-mode noise reduction, comprising:

an array of an even-numbered plurality N of transducer means for converting between electric and ultrasonic signals, each assigned to a like-numbered one of a plurality of channels, with the transducer means in (N/2) of the channels being polarized in a direction opposite to the polling direction of the transducer means in the other (N/2) of the channels;

( a plurality N of channel means each for separately processing a received signal from the transducer means of that channel;

a plurality (N/2) of inversion means, each in a different one of the (N/2) channels having transducer means polled in a selected polling direction, for providing an output signal which includes an inverted-polarity version of the processed received signal in that channel; and means for summing all inverted-polarity output signals from all of said inversion means and all processed signals from all of the remaining channels, to cause all transducer means signals to be summed while undesired signals commonly present after said transducer means are substantially rejected.

2. The system of claim 1 wherein the polling of said transducer means alternates in successive channels.

3. The system of claim 2, wherein one of said inversion means is present in each even-numbered channel.

4. The system of claim 1, wherein each transducer means contains a single transducer element, and the polling direction of the transducer elements alternate in sequential channels.

5. The system of claim 4, wherein positively-polarized transducer elements are located in odd-numbered channels.

6. The system of claim 5, wherein one of said inversion means is present in each even-numbered channel.

7. The system of claim 1, wherein said summing means provides a coherent sum of all signals input thereto.

8. The system of claim 1, wherein each channel includes a differential-input amplifier, and each transducer means comprises a pair of oppositely-polled transducer elements, with a first element coupled to an inverting input of the channel amplifier and a second element coupled to a non-inverting channel amplifier input, and the transducer means received signal being taken from the output of the channel amplifier as the difference between received signals from the first and second elements.

9. The system of claim 8, wherein the first elements of each of the plurality of channels is polled in the same direction.

10. The system of claim 8, wherein the first element in a particular channel is polled in a direction opposite to the polling direction of the first element in an adjacent channel.

11. The system of claim 1, further comprising means for pulsing each transducer means, during formation of a transmission beam by the array, with an instantaneous polarity dependent upon the polarity of the particular transducer means being pulsed.

* * * * *

UNITED STATES PATENT AND TRADEMARK OFFICE
CERTIFICATE OF CORRECTION

PATENT NO. : 5,062,429

DATED : November 5, 1991

INVENTOR(S) : Lowell S. Smith and Edward J. Piel, Jr.

It is certified that error appears in the above-identified patent and that said Letters Patent is hereby corrected as shown below:

Title page, item (75), the second inventor should read --
Joseph E. Piel, Jr. --.

Signed and Sealed this

Second Day of March, 1993

Attest:

STEPHEN G. KUNIN

*Attesting Officer*     *Acting Commissioner of Patents and Trademarks*